United States Patent
Willett et al.

(10) Patent No.: US 9,953,638 B2
(45) Date of Patent: Apr. 24, 2018

(54) META-DATA INPUTS TO FRONT END PROCESSING FOR AUTOMATIC SPEECH RECOGNITION

(75) Inventors: Daniel Willett, Walluf (DE); Karl Jonas Lööf, Aachen (DE); Yue Pan, Winchester, MA (US); Joel Pinto, Aachen (DE); Christian Gollan, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 47 days.

(21) Appl. No.: 14/411,236

(22) PCT Filed: Jun. 28, 2012

(86) PCT No.: PCT/US2012/044514
§ 371 (c)(1),
(2), (4) Date: May 29, 2015

(87) PCT Pub. No.: WO2014/003748
PCT Pub. Date: Jan. 3, 2014

(65) Prior Publication Data
US 2015/0262575 A1    Sep. 17, 2015

(51) Int. Cl.
*G10L 15/14* (2006.01)
*G10L 15/20* (2006.01)
*G10L 25/30* (2013.01)
*G10L 15/02* (2006.01)

(52) U.S. Cl.
CPC .............. *G10L 15/14* (2013.01); *G10L 15/20* (2013.01); *G10L 15/02* (2013.01); *G10L 25/30* (2013.01)

(58) Field of Classification Search
CPC ...................................................... G10L 15/30
See application file for complete search history.

(56) References Cited

U.S. PATENT DOCUMENTS

| 5,737,485 | A | | 4/1998 | Flanagan et al. |
| 5,737,716 | A | * | 4/1998 | Bergstrom .............. G10L 19/02 704/202 |
| 5,794,189 | A | | 8/1998 | Gould |
| 5,970,446 | A | * | 10/1999 | Goldberg ................ G10L 15/20 704/233 |
| 6,070,139 | A | * | 5/2000 | Miyazawa ............ G10L 15/065 704/270 |

(Continued)

OTHER PUBLICATIONS

Bocchieri, Enrico, and Diamantino Caseiro. "Use of geographical meta-data in ASR language and acoustic models." Acoustics Speech and Signal Processing (ICASSP), 2010 IEEE International Conference on. IEEE, 2010.*

(Continued)

*Primary Examiner* — Brian L Albertalli
(74) *Attorney, Agent, or Firm* — Banner & Witcoff, Ltd.

(57) ABSTRACT

A computer-implemented method is described for front end speech processing for automatic speech recognition. A sequence of speech features which characterize an unknown speech input provided on an audio input channel and associated meta-data which characterize the audio input channel are received. The speech features are transformed with a computer process that uses a trained mapping function controlled by the meta-data, and automatic speech recognition is performed of the transformed speech features.

20 Claims, 2 Drawing Sheets

(56) References Cited

U.S. PATENT DOCUMENTS

| | | | |
|---|---|---|---|
| 6,167,377 A | 12/2000 | Gillick et al. | |
| 7,996,224 B2* | 8/2011 | Bacchiani | G10L 15/193 704/254 |
| 8,635,243 B2* | 1/2014 | Phillips | G10L 15/22 704/235 |
| 2003/0236099 A1* | 12/2003 | Deisher | G10L 15/20 455/522 |
| 2005/0043957 A1* | 2/2005 | Lin | G10L 17/26 704/277 |
| 2007/0112567 A1* | 5/2007 | Lau | G06K 9/72 704/240 |
| 2008/0221902 A1* | 9/2008 | Cerra | G10L 15/065 704/270.1 |
| 2008/0300871 A1* | 12/2008 | Gilbert | G10L 15/20 704/233 |
| 2009/0106028 A1* | 4/2009 | Dhanakshirur | G10L 15/065 704/270.1 |
| 2011/0144973 A1* | 6/2011 | Bocchieri | G06F 17/289 704/2 |
| 2011/0257974 A1* | 10/2011 | Kristjansson | G10L 21/0208 704/246 |
| 2012/0053942 A1* | 3/2012 | Minamino | G10L 15/32 704/251 |
| 2012/0065976 A1* | 3/2012 | Deng | G10L 15/14 704/256.1 |
| 2013/0103399 A1* | 4/2013 | Gammon | G10L 21/10 704/235 |

OTHER PUBLICATIONS

Lin, Xiaofan. "Decision combination in speech metadata extraction." Signals, Systems and Computers, 2004. Conference Record of the Thirty-Seventh Asilomar Conference on. vol. 1. IEEE, 2003.*

Abdel-Rahman Mohamed et al., "Deep Belief Networks using discriminative features for phone recognition", Acustics, Speech and Signal Processing (ICASSP), May 22, 2011, pp. 5060-5063, XP032001819, ISBN: 978-4577-0538-0, Yorktown Heights, NY.

International Search Report and Written Opinion dated Oct. 5, 2012 (PCT/US2012/044514); ISA/EP.

Hermansky et al., Tandem Connectionist Feature Extraction for Conventional HMM Systems, in Proc. ICASSP, 2000.

Daniel Povey, Improvements to fMPE for Discriminative Training of Features, Interspeech 2005.

Aug. 23, 2016 (EP) Examination Report—App. 12735984.2.

* cited by examiner

META-DATA INPUTS TO FRONT END PROCESSING FOR AUTOMATIC SPEECH RECOGNITION

CROSS-REFERENCE TO RELATED APPLICATION

This application is the National Stage of International Application No. PCT/US2012/044514, filed Jun. 28, 2012, which is incorporated herein by reference.

FIELD OF THE INVENTION

The invention generally relates to automatic speech recognition (ASR), and more specifically, to use of meta-data in front end feature processing for ASR.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input speech frames to find statistical models that best match the speech feature characteristics and then determines a corresponding representative text or semantic meaning associated with the statistical models. Modern statistical models are state sequence models such as hidden Markov models (HMMs) that model speech sounds (usually phonemes) using mixtures of Gaussian distributions. Often these statistical models represent phonemes in specific contexts, referred to as PELs (Phonetic Elements), eg., triphones or phonemes with known left and/or right contexts. State sequence models can be scaled up to represent words as connected sequences of acoustically modeled phonemes, and phrases or sentences as connected sequences of words. When the statistical models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

In many ASR applications—for example, cloud-based client-server ASR—the speech recognizer is exposed to speech data acquired from many different devices operating in various acoustic environments and from different applications such as messaging or voice search. Device type, microphone type (and position on the device) as well as acoustic environment have an influence on the observed audio. To a somewhat lesser degree, application type has this effect as it affects speaking style and the way users generally hold and operate the device. Furthermore, the acoustic signal as observed at the ASR system usually has passed through a data channel of limited bandwidth that requires application of an encoding that comes along with information loss (lossy codec). Often, this information on device- and microphone-type, on application, on codec setting is available to the server recognizer as meta-data that characterizes such aspects of the audio input channel.

Meta-data typically is categorical information that can attain one of a finite set of values. Representing this data as input for neural networks or other forms of linear and non-linear transformations allows many approaches. Categorical information can be represented as numerical values, for example, by representing each category as an integer or using 1-of-N encoding.

SUMMARY OF THE INVENTION

Embodiments of the present invention include a computer-implemented method employing at least one hardware implemented computer processor for front end speech processing for automatic speech recognition. A sequence of speech features which characterize an unknown speech input provided on an audio input channel and associated meta-data which characterize the audio input channel are received. The speech features are transformed with a computer process that uses a trained mapping function controlled by the meta-data. A computer process is then used to perform automatic speech recognition of the transformed speech features.

The meta-data may include meta-data characterizing a source channel which generates the unknown speech input, an audio codec applied when generating the speech features, a source environment in which the unknown speech input is generated, and/or a source application which generates the unknown speech input. The mapping function may be, for example, a multilayered perceptron (MLP) mapping function, a deep belief network (DBN) mapping function, and/or a feature-space maximum mutual information (fMMI) mapping function. The steps may be performed in real time with minimum response latency.

DETAILED DESCRIPTION OF SPECIFIC EMBODIMENTS

Various embodiments of the present invention directly use the meta-data commonly included in the audio input channel signal for front-end feature processing in ASR. This can provide better channel-, environment- and application-normalized speech features and helps address the impact of the channel, environment and application on the observed speech audio in server-side cloud-based ASR to improve system performance (general accuracy, compute speed and latency) as well as robustness to outlier channel and environment types.

The direct exploitation of the meta-data in the speech feature front-end can come in various specific arrangements. For example, the meta-data can be used as an additional input to trained mapping functions such as a Multi-Layer-Perceptron (MLP) or Deep Belief Network (DBN) used as a feature generator. For discriminative feature spaces such as feature-space maximum mutual information (fMMI) that utilize a set of Gaussian distributions as generators of a new high dimensional feature space, meta-data can be integrated using a meta-data enhanced mapping prior to input to the set of Gaussians, e.g., an MLP applied as a feature generator of what goes into the fMMI transformation. Alternatively, meta-data integration into fMMI can be approached via replacement of the set of Gaussians via Neural Network-based posterior estimates that see the meta-data as input.

Figure 1:
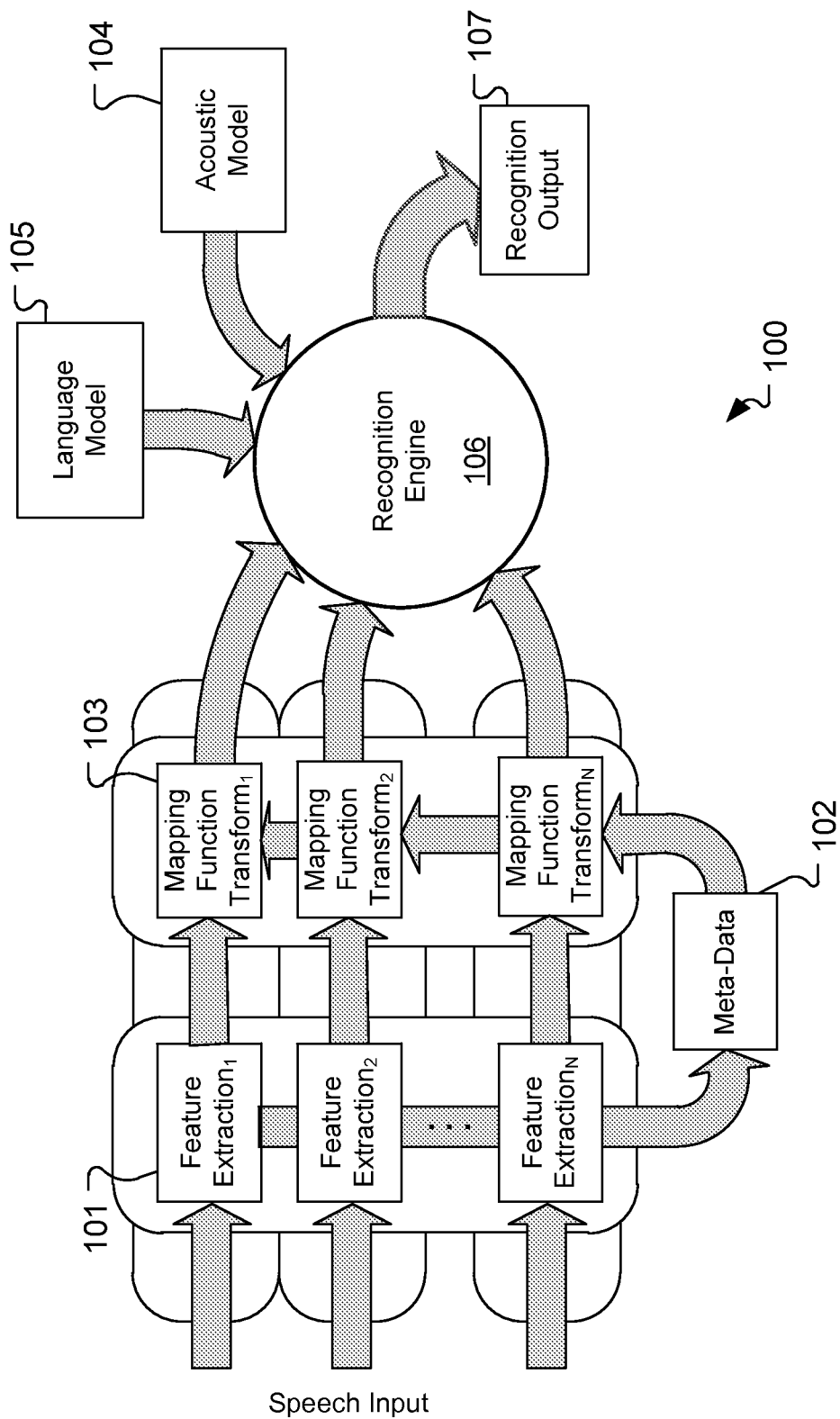
FIG. 1 shows an example of ASR system according to one embodiment of the present invention.
Figure 2:
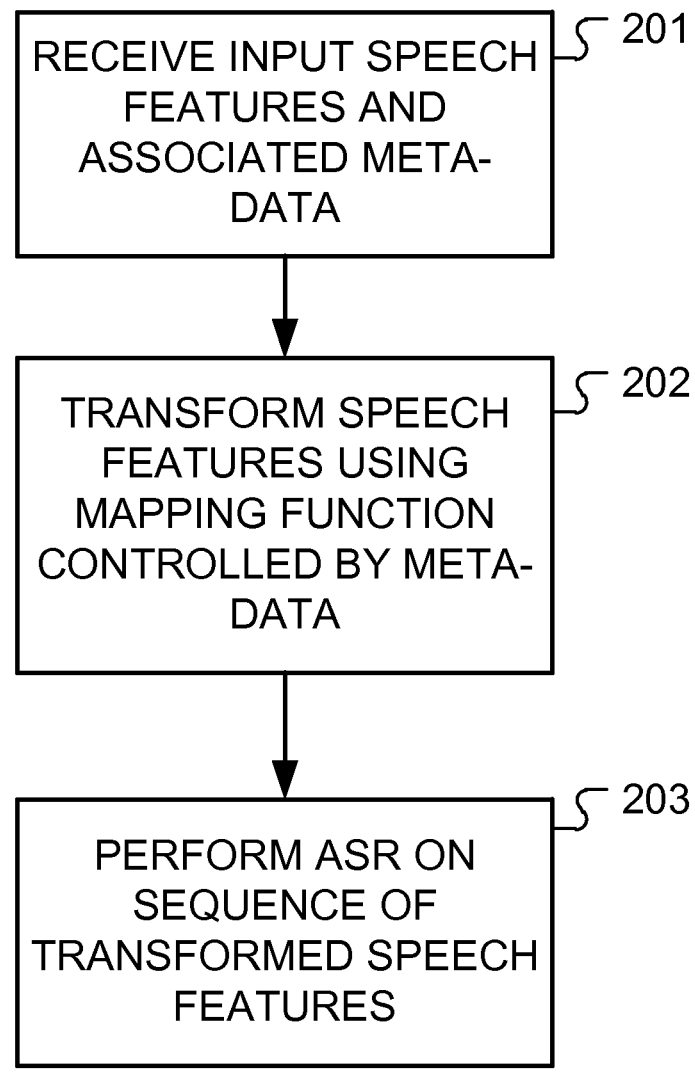
FIG. 2 shows various logical steps in a method of front end speech feature processing using meta-data according to an embodiment of the present invention.

FIG. 1 shows an example of ASR system and FIG. 2 shows various logical steps in a method of front end speech feature processing using meta-data according to an embodiment of the present invention. An unknown speech signal from one of a variety of source channels 1-N is input to a feature extraction module 101 of the ASR system 100. The feature extraction module 101 uses a computer process to create pre-processed audio that includes a sequence of representative speech features which characterize the input signal and meta-data 102 which characterize the audio input channel, step 201.

The meta-data 102 may include meta-data characterizing a source channel which generates the unknown speech input, a source environment in which the unknown speech input is generated, and/or a source application which generates the unknown speech input.

One specific example of a meta-data based additional input to a feature transformation would be a case where microphone type information is available as meta-data, and assuming the categories:

a) built-in mic
b) external mic

This information could be fed into the feature transformation as a binary input assuming the values 0 and 1. The size of the data stream after audio encoding (codec) is one specific example of meta-data that directly comes as a number. Depending on the codec setting, this can be characterized as arbitrary numbers of bits per second, e.g., 28.8 kbps. A more complex example might be a device type that has more categories, like a hypothetical:

|  | iPhn4S | iPad2 | iOS | headset |
|---|---|---|---|---|
| a) iPhone4S | 1 | 0 | 1 | 1 |
| b) other iPhone | 0 | 0 | 1 | 1 |
| c) iPad2 | 0 | 1 | 1 | 0 |
| d) other iPad | 0 | 0 | 1 | 0 |
| e) other headset | 0 | 0 | 0 | 1 |
| f) other tablet | 0 | 0 | 0 | 0 |

Then the meta-data information could be decoded as a string of binary values.

A trained mapping function transform 103 controlled by the meta-data 102 then transform the pre-processed audio speech features, step 202, to produce a sequence of transformed speech features. The transformation generally provides dimensionality reduction, a better fit of the speech features to the acoustic model, and normalization (reduction of channel-, speaker-, and/or environment-impact) which is extended by the direct input of the meta-data information.

For example, the trained mapping function transform 103 may be a segmentation multilayered perceptron (MLP) that performs a mapping function trained on segmentation for the input speech features and meta-data to produce monophone output states (e.g., ~150). The output states of the segmentation MLP may then be transformed by a feature-space maximum mutual information (fMMI) mapping function trained on the MLP-output posteriors rather than conventional Gaussian posteriors. See Hermansky et al., *Tandem Connectionist Feature Extraction for Conventional HMM Systems*, in Proc. ICASSP, 2000; Daniel Povey, *Improvements to fMPE for Discriminative Training of Features*, Interspeech 2005; which are incorporated herein by reference. Other embodiments could use other specific arrangements, for example, using a deep belief network (DBN), cepstral mean normalization (CMN), cepstral variance normalization (CVN), linear discriminant analysis (LDA), and/or feature-space maximum likelihood linear regression (fMLLR), etc. This front-end feature processing may be performed in real time with minimum response latency for cloud-based ASR as for a dictation application. Speech recognition engine 106 then compares the transformed speech features to acoustic models 104 and language model 105 to determine a recognition output 107, step 203.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system, for example, as a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
receiving, by a computing device, a sequence of speech features that characterize an unknown speech input provided on an audio input channel controlled by an application executing on the computing device;
receiving meta-data that characterizes the audio input channel, an audio codec applied when generating the sequence of speech features, and a type of the application;
transforming the sequence of speech features using one or more trained mapping functions including a feature-space maximum mutual information (fMMI) mapping function, the one or more trained mapping functions controlled by the meta-data that characterizes the audio input channel, the audio codec applied when generating the sequence of speech features, and the type of the application, the fMMI mapping function using neural network based posterior estimates that use the meta-data as input; and
performing automatic speech recognition of the transformed speech features.

2. The method of claim 1, wherein the one or more trained mapping functions include at least one of a multilayered perceptron (MLP) mapping function or a deep belief network (DBN) mapping function.

3. The method of claim 2, wherein the MLP mapping function comprises a mapping function trained on segmentation for the sequence of speech features and the meta-data.

4. The method of claim 1, wherein the fMMI mapping function comprises a mapping function trained on MLP output posteriors of the MLP mapping function.

5. The method of claim 1, wherein the application executing on the computing device comprises a messaging application, and the meta-data characterizes the messaging application.

6. The method of claim 1, wherein the application executing on the computing device comprises a voice-search application, and the meta-data characterizes the voice-search application.

7. The method of claim 1, wherein the application executing on the computing device comprises a dictation application, and the meta-data characterizes the dictation application.

8. The method of claim 1, wherein transforming the sequence of speech features comprises normalizing the sequence of speech features to reduce channel impact of the audio input channel.

9. The method of claim 1, wherein transforming the sequence of speech features comprises normalizing the sequence of speech features to reduce speaker impact of a speaker of the unknown speech input.

10. The method of claim 1, wherein transforming the sequence of speech features comprises normalizing the sequence of speech features to reduce environmental impact of a source environment in which the unknown speech input is generated.

11. The method of claim 1, wherein the meta-data characterizes a source environment in which the unknown speech input is generated.

12. The method of claim 1, wherein the meta-data characterizes a microphone type of the audio input channel.

13. One or more non-transitory computer-readable media storing executable instructions that, when executed by a processor, cause a system to:
receive a sequence of speech features that characterize an unknown speech input provided on an audio input channel controlled by an application executing on the system;
receive meta-data that characterizes the audio input channel, an audio codec applied when generating the sequence of speech features, and a type of the application;
transform the sequence of speech features using one or more trained mapping functions including a feature-space maximum mutual information (fMMI) mapping function, the one or more trained mapping functions controlled by the meta-data that characterizes the audio input channel, the audio codec applied when generating the sequence of speech features, and the type of the application, the fMMI mapping function using neural network based posterior estimates that use the meta-data as input, wherein transforming the sequence of speech features comprises reducing a dimensionality of the sequence of speech features; and
perform automatic speech recognition of the transformed speech features.

14. The one or more non-transitory computer-readable media of claim 13, wherein the one or more trained mapping functions include a cepstral variance normalization (CVN) mapping function.

15. The one or more non-transitory computer-readable media of claim 13, wherein the one or more trained mapping functions include a linear discriminant analysis (LDA) mapping function.

16. The one or more non-transitory computer-readable media of claim 13, wherein the one or more trained mapping functions include a feature-space maximum likelihood linear regression (fMLLR) mapping function.

17. A system comprising:
at least one processor; and
one or more non-transitory computer-readable media storing executable instructions that, when executed by the at least one processor, cause the system to:
receive a sequence of speech features that characterize an unknown speech input provided on an audio input channel controlled by an application executing on the system;
receive meta-data that characterizes the audio input channel, an audio codec applied when generating the sequence of speech features, a microphone type of the audio input channel, and a type of the application;
transform the sequence of speech features using one or more trained mapping functions including a feature-space maximum mutual information (fMMI) mapping function, the one or more trained mapping functions controlled by the meta-data that characterizes the audio input channel, the audio codec applied when generating the sequence of speech features, the microphone type of the audio input channel, and the type of the application, the fMMI mapping function using neural network based posterior estimates that use the meta-data as input; and perform automatic speech recognition of the transformed speech features.

18. The system of claim 17, wherein the microphone type is a built-in microphone, and the meta-data characterizes the audio input channel as the built-in microphone.

19. The system of claim 17, wherein the microphone type is an external microphone that is external to the system, and the meta-data characterizes the audio input channel as the external microphone.

20. The system of claim 17, wherein the meta-data further comprises a number representing a size of a data stream after audio encoding of the unknown speech input.

* * * * *